Patented Aug. 17, 1943

2,327,174

UNITED STATES PATENT OFFICE 2,327,174

PREPARATION OF HALOGENATED OLEFINS

Oliver W. Cass, Niagara Falls, N. Y., assignor to E. I. du Pont de Nemours & Company, Wilmington, Del., a corporation of Delaware No Drawing. Application August 21, 1940, Serial No. 353,541

12 Claims. (Cl. 260—654)

This invention relates to the preparation of unsaturated halogenated hydrocarbons and more particularly it is directed to the preparation of halogenated olefins by the reaction of oxygen and halogens with olefinic hydrocarbons.

It has been known heretofore to prepare saturated chlorinated hydrocarbons by the addition of halogens to the double bond of an olefin. Thus, for example, ethylene dichloride may be readily prepared by the reaction of chlorine with ethylene. Also, it is known that olefinic hydrocarbons can be halogenated by reacting the same with halogens, whereby for each atom of halogen substituted in the hydrocarbon molecule one molecule of hydrogen halide is produced as a by-product. Usually it is impractical to recover the by-product hydrogen halide economically, and since a maximum of only one-half of the halogen consumed appears in the halogenated product, such procedures involve uneconomic utilization of the halogen.

An object of the present invention is to provide a new and improved method for preparing halogenated olefinic products. A further object is to provide a method for preparing olefins wherein olefin, oxygen and halogens are utilized as the raw materials. A further object is to provide a method for the halogenation of olefins wherein substantially all of the halogen is utilized in the halogenation reaction to the substantial exclusion of the formation of by-product hydrogen halide. Other objects and advantages of the invention will be apparent hereinafter.

These objects are obtained in accordance with the present invention by reacting an olefinic hydrocarbon with a halogen and oxygen in the presence of an oxidation catalyst at a temperature on the order of 250 to 600° C. Thus, for example, by the reaction of ethylene with chlorine and oxygen I may obtain various chlorinated ethylenes such as vinyl chloride, dichlorethylene, trichlorethylene, and perchlorethylene. The reactions which take place may be represented by the following equations:

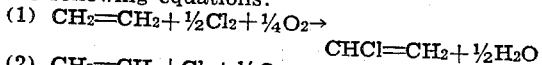
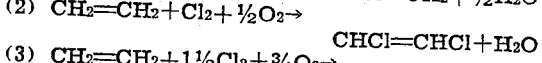
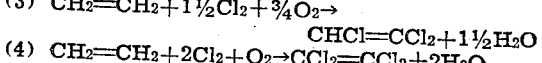
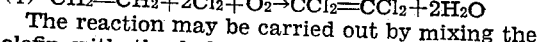

The reaction may be carried out by mixing the olefin with the halogen and air or oxygen and passing the mixture over the catalyst in a heated reaction chamber; or, if desired, the three constituents may be introduced into the reaction space in separate streams; or the air or oxygen may be introduced into a mixture of the olefin and halogen. It should be noted, however, that the olefin and oxygen should not be permitted to reach reaction temperature in the absence of the halogen.

The products of reaction may be recovered by subjecting the gases leaving the reaction chamber to refrigeration to condense the halogenated olefins. The crude liquid product, after neutralization of any free acid present, may then be separated into its various constituents by the usual methods of fractional distillation.

The relative proportions of the reactants used will vary considerably, depending upon the particular olefin employed and also upon the final product desired. Thus, as indicated by the equations given above, one-half mole of chlorine and one-quarter mole of oxygen are required for the conversion of one mole of ethylene to vinyl chloride, whereas two moles of chlorine and one mole of oxygen are theoretically required for the conversion of one mole of ethylene to perchlorethylene. In practice, of course, not all of the halogen will enter into combination with the hydrocarbon, usually about 5 to 10% of that fed into the reaction chamber appearing in the final product as free hydrogen halide, while about 90 to 95% of the halogen is converted to halogenated hydrocarbons. As shown in the above equations, one-half mole of oxygen is required for each mole of halogen reacted. As shown in the examples following, this ratio of oxygen to halogen may be varied somewhat in practice. When the higher halogenated compounds are the ultimate products desired, the constituents of the reaction products which are of a lower degree of chlorination may be recycled in the process and thereby excellent yields of the higher halogenated products are secured. On the other hand, when the lower halogenated compounds are the desired products, the amount of higher halogenated compounds produced may be decreased by increasing the ratio of olefin to halogen and oxygen, and recycling the unreacted excess of olefin.

The use of an oxidation catalyst is essential in order to obtain good yields of unsaturated halogenated compounds. Practically all of the oxidation catalysts known in the art are effective at least to some degree in promoting the reaction. In general, I prefer to utilize metals or metal compounds such as oxides and salts. The preferred catalysts are oxides or compounds of copper, iron and bismuth and, in general, the best results are obtained by the use of a copper catalyst which may be in the metallic state or as copper oxide or a copper salt. Many other metals and their compounds, however, have been found to be effective as, for example, zinc oxide, barium oxide, alumina, various rare earth oxides, magnesium oxide, manganese oxide, silver oxide, titanium dioxide, lead oxide, bismuth oxide, cobalt oxide, nickel oxide, magnesium sulfate, and molybdenum dioxide.

Preferably the catalysts are deposited on refractory supports such as pumice, silica gel, alumina gel, fire brick, porcelain, or the like. Such supported catalysts may readily be prepared by saturating a porous refractory material with a solution of the metal salt or metal compound. If the metal compound used is readily converted to the oxide under the conditions of the reaction, it is simply necessary to dry the saturated catalyst support and then it is ready for use. In other cases, it may be preferable first to reduce the metal compound on the support to the metallic form which then may be oxidized, preferably by heating the catalyst in an atmosphere of air or oxygen prior to use. The various methods known for preparing catalysts according to these principles may be utilized in practicing my invention. I have obtained excellent results in a large number of reactions by saturating fire brick with solutions of copper salts such as the sulfate, nitrate, or chloride.

The following examples are given as further illustrating the principles of the invention, it being understood, however, that the invention is not limited in any way to these specific embodiments.

*Example I*

A mixture of ethylene (100 moles), chlorine (150 moles) and oxygen (90 moles) is passed over a catalyst consisting of copper oxide supported upon fire brick at a temperature of 375 to 425° C. For each 100 moles of ethylene there are produced 10 to 20 moles of symmetrical dichlorethylene, 20 to 30 moles of trichlorethylene, and 30 to 40 moles of perchlorethylene, with minor proportions (ranging up to perhaps 5 moles) of vinyl chloride. Minor amounts of carbon monoxide and carbon dioxide, produced by the direct oxidation of the ethylene, are also formed, as well as small amounts of saturated hydrocarbons such as dichloro-, trichloro-, tetrachloro-, and pentachloroethanes.

*Example II*

By carrying out the same procedure as described in Example I, but utilizing an initial mixture consisting of 100 moles of ethylene, 200 moles of chlorine, and 110 moles of oxygen, there is obtained a product which is substantially free from unconverted ethylene and vinyl chloride and containing 5 to 10% dichlorethylene, 25 to 35% trichlorethylene, and 50 to 60% perchlorethylene. By recycling the dichlor- and trichlorethylenes it is possible to obtain a yield of 75 to 80% of tetrachlorethylene.

*Example III*

By carrying out the same procedure as in Examples I and II with a mixture consisting of 100 moles of ethylene, 100 moles of chlorine, and 50 moles of oxygen, there is obtained a reaction product comprising 10 to 30 moles of unreacted ethylene, 35 to 50 moles of vinyl chloride, 10 to 20 moles of dichlorethylene, 10 to 20 moles of trichlorethylene, and 5 to 10 moles of perchlorethylene.

While in the foregoing description of the invention reference has been made particularly to ethylene as the olefinic raw material, the invention is not restricted to the use of ethylene, inasmuch as it is generally applicable to the halogenation of olefinic hydrocarbons in general. Thus, when propylene is reacted with oxygen and chlorine under similar conditions, chloropropylenes such as allyl chloride ($CH_2=CHCH_2Cl$) and alpha methyl vinyl chloride ($CH_2=CClCH_3$) are obtained as the principal products, with minor proportions of decomposition products of these compounds such as methyl acetylene $$(CH\equiv CCH_3)$$

and allylene  ; also various polychloropropylenes such as $CH_3CH=CCl_2$ and $CH_3CCl=CCl_2$.

Similarly, with butylene and butadiene various chlorinated butylenes and chlorobutadienes such as chloroprene ($CH_2=CClCH=CH_2$) are obtained. The reaction may also be applied to the chlorination of higher olefins, although of course, as the number of carbon atoms in the olefin increases, the complexity of the reaction products proportionately increases due to the large number of possible isomers obtainable.

The reaction may also be carried out with bromine to prepare the corresponding brominated olefins. When bromine is used, the optimum reaction temperatures are somewhat lower than with chlorine.

It is to be understood that the invention is not confined to the specific embodiments described hereinabove, but includes all such variations, modifications, and equivalents as fall within the scope of the appended claims.

I claim:

1. The method of effecting substitution halogenation of an olefinic hydrocarbon containing from two to four carbon atoms which comprises reacting the same with a halogen having an atomic weight between 35 and 80 and oxygen in the ratio of approximately one-half mole of oxygen to one mole of halogen in the presence of an oxidation catalyst at a temperature of 250 to 600° C.

2. The method of effecting substitution chlorination of an olefinic hydrocarbon containing from two to four carbon atoms which comprises reacting the same with chlorine and oxygen in the ratio of approximately one-half mole of oxygen to one mole of chlorine in the presence of an oxidation catalyst at a temperature of 250 to 600° C.

3. The method of effecting substitution chlorination of an olefinic hydrocarbon containing from two to four carbon atoms which comprises reacting the same with chlorine and oxygen in the ratio of approximately one-half mole of oxygen to one mole of chlorine in the presence of a catalyst comprising essentially a metal oxide at a temperature of 250 to 600° C.

4. The method of effecting substitution chlorination of an olefinic hydrocarbon containing from two to four carbon atoms which comprises reacting the same with chlorine and oxygen in the ratio of approximately one-half mole of oxygen to one mole of chlorine in the presence of a copper compound as a catalyst at a temperature of 250 to 600° C.

5. The method of effecting substitution chlorination of an olefinic hydrocarbon containing from two to four carbon atoms which comprises reacting the same with chlorine and oxygen in the ratio of approximately one-half mole of oxygen to one mole of chlorine in the presence of a copper compound as a catalyst at a temperature of 375 to 425° C.

6. The method of effecting substitution halogenation of ethylene which comprises reacting the same with a halogen having an atomic weight between 35 and 80 and oxygen in the ratio of approximately one-half mole of oxygen to one mole of halogen in the presence of an oxidation catalyst at a temperature of 250 to 600° C.

7. The method of effecting substitution chlorination of ethylene which comprises reacting the same with chlorine and oxygen in the ratio of approximately one-half mole of oxygen to one mole of chlorine in the presence of an oxidation catalyst at a temperature of 250 to 600° C.

8. The method of effecting substitution chlorination of ethylene which comprises reacting the same with chlorine and oxygen in the ratio of approximately one-half mole of oxygen to one mole of chlorine in the presence of a copper compound as a catalyst at a temperature of 250 to 600° C.

9. The method of effecting substitution chlorination of ethylene which comprises reacting the same with chlorine and oxygen in the ratio of approximately one-half mole of oxygen to one mole of chlorine in the presence of a copper compound as a catalyst at a temperature of 375 to 425° C.

10. The method of effecting substitution halogenation of an olefinic hydrocarbon containing from two to four carbon atoms which comprises reacting the same with a halogen having an atomic weight between 35 and 80 and oxygen in the ratio of approximately one-half mole of oxygen to one mole of halogen in the presence of a catalyst comprising essentially a metal oxide at a temperature of 250 to 600° C.

11. The method of effecting substitution halogenation of an olefinic hydrocarbon containing from two to four carbon atoms which comprises reacting the same with a halogen having an atomic weight between 35 and 80 and oxygen in the ratio of approximately one-half mole of oxygen to one mole of halogen in the presence of a copper compound as a catalyst at a temperature of 250 to 600° C.

12. The method of effecting substitution halogenation of an olefinic hydrocarbon containing from two to four carbon atoms which comprises reacting the same with a halogen having an atomic weight between 35 and 80 and oxygen in the ratio of approximately one-half mole of oxygen to one mole of halogen in the presence of a copper compound as a catalyst at a temperature of 375 to 425° C.

OLIVER W. CASS.